Oct. 10, 1950 L. J. BERBERICH ET AL 2,525,473
DIELECTRIC
Filed June 16, 1945
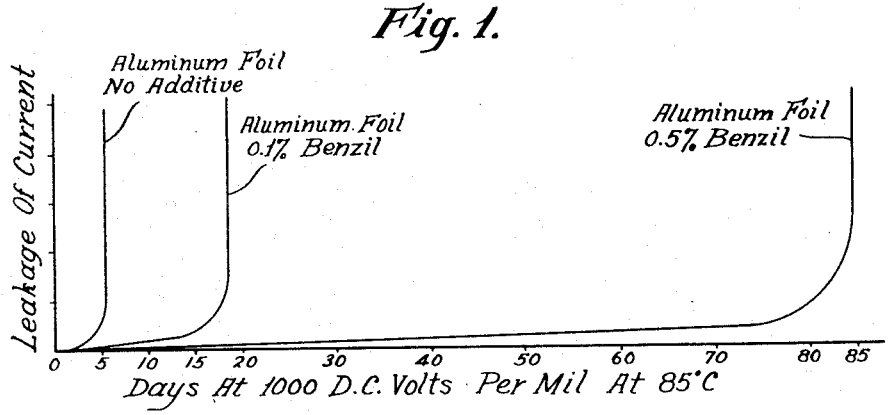
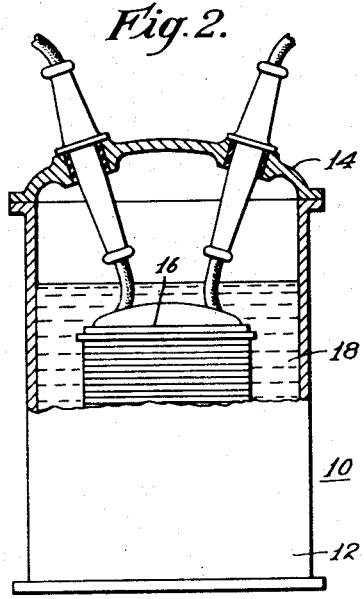
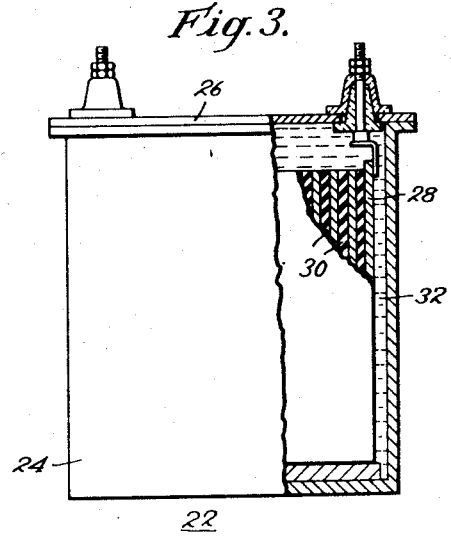
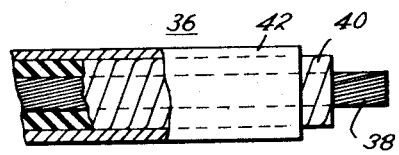
WITNESSES:
Edward Michaels
F. Shape
INVENTORS
Leo J. Berberich &
Raymond Friedman.
BY
Ezra W. Savage
ATTORNEY Patented Oct. 10, 1950

2,525,473

UNITED STATES PATENT OFFICE 2,525,473

DIELECTRIC

Leo J. Berberich and Raymond Friedman, Pittsburgh, Pa., assignors to Westinghouse Electric Corporation, East Pittsburgh, Pa., a corporation of Pennsylvania Application June 16, 1945, Serial No. 599,836

12 Claims. (Cl. 175—41)

This invention relates to dielectric fluids and in particular to halogenated aromatic compounds employed in capacitors.

Halogenated organic compounds are employed extensively as capacitor dielectrics. These compounds have several advantages over other dielectric liquids particularly due to their high dielectric constant and lack of flammability. The chlorinated aromatic compounds such, for example, as chlorinated diphenyl, have given exceptionally good results as dielectrics for electrical apparatus. Under ordinary conditions, the chlorinated aromatic compounds are extremely stable and can be heated in air to temperatures of as high as 150° C. for prolonged periods of time without appreciable decomposition. It has been discovered, however, that, when applied to capacitors where they are in contact with paper and aluminum or copper foil, the halogenated compounds decompose or seriously deteriorate within a short period of time at temperatures of the order of 85° C. when direct current stresses are applied. When subjected to direct-current voltage as may occur in certain applications, the failure of capacitors impregnated with chlorinated organic compounds is much more rapid than when subjected to alternating current alone of comparable magnitude.

It is not definitely known what the mechanism of the decomposition of the halogenated dielectric fluids is, but it is believed to be due to an electrolysis phenomenon catalyzed by the aluminum or copper metal. In practice, it has been observed that failure of a capacitor is usually preceded by a rapid rise in the leakage current.

According to the present invention, we have discovered certain additives which, in combination with halogenated organic compounds such, for example, as chlorinated diphenyl, produce dielectric liquids having a greatly increased life under conditions usually leading to rapid deterioration of the halogenated dielectric liquids alone.

An object of this invention is to provide for stabilizing halogenated dielectric liquids by combining diaryl diketones therewith.

A further object of the invention is to provide an improved dielectric liquid composed of a halogenated organic compound and a minor proportion of a diaryl diketone.

A still further object of the invention is to provide electrical apparatus such as capacitors insulated with a dielectric liquid composed of a major proportion of a chlorinated organic compound and a minor proportion of a diaryl diketone.

Other objects of the invention will in part be obvious and will in part appear hereinafter. For a fuller understanding of the nature and objects of this invention, reference should be had to the following detailed description and drawing, in which:

Figure 1 is a chart plotting leakage current against days at 1,000 volts per mil at 85° C.

Fig. 2 is a view in elevation, partly in section, of a transformer.

Fig. 3 is a view in elevation, partly in section, of a capacitor, and

Fig. 4 is a fragmentary view, partly in section, of a cable.

We have discovered that halogenated organic compounds usable as liquid dielectrics may be improved by applying thereto a minor proportion of a diaryl diketone. The diaryl diketones of this invention have the formula:

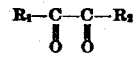

where $R_1$ and $R_2$ are aryl radicals, such for example, as phenyl, tolyl, xylyl, nitrophenyl, naphthyl, chlorophenyl, fluorophenyl and diphenyl. $R_1$ and $R_2$ may be the same or dissimilar aryl groups. Examples of suitable compounds are phenyl tolyl diketone, diphenyl diketone, orthonitrophenyl paranitrophenyl diketone, tolyl xylyl diketone and bis (dichlorophenyl) diketone. The aryl radical should contain no amine groups or other groups which will ionize in or react with halogenated dielectric liquids and thereby deteriorate the liquid dielectric or decrease the insulating characteristics thereof. Thus, for example, diaryl diketones that give off hydrochloric acid would be undesirable. It has been found that benzil (diphenyl diketone) and nitrobenzil, particularly bis (nitrophenyl) diketone, are exceptionally effective compounds of the diaryl diketones for our purpose. Diaryl diketones may be added in amounts of from 0.01% to as much as 5% of the weight of the halogenated organic compounds to stabilize the dielectric liquid.

An advantage of the diaryl diketones over other compounds which it has been proposed to add to halogenated dielectric liquids resides in the fact that the diaryl diketones may be added in sufficiently large quantities that will give a more permanent outstanding improvement. For example, chlorinated diphenyl will easily dissolve 1% of its weight of benzil at 25° C. and the benzil will not precipitate even when the temperature is considerably decreased. Other additives proposed heretofore were only slightly soluble even at temperatures above 25° C. and would precipitate out of solution on a moderately cool day.

Referring to the following Table I, there is set forth the effect of the addition of benzil to a chlorinated diphenyl dielectric fluid applied to a standard paper capacitor employing aluminum foil as the electrode material with 1,000 volts per mil direct current being applied continuously as an accelerated life test.

*Table I*

| Benzil Concentration, Per Cent by weight | Avg. Capacitor Life, Days | |
|---|---|---|
| | 85° C. | 100° C. |
| 0 | 5.4 | 1.5 |
| 0.1 | 18.3 | |
| 0.5 | 84.3 | 6.5 |

Further referring to Fig. 1 of the drawing, there is plotted leakage current against days at 1,000 volts direct current per mil at 85° C. when various proportions of benzil were incorporated in a predominately 50 to 60% chlorinated diphenyl capacitor dielectric. It will be obvious that the improvement secured by the addition of 0.5% of benzil will enable the capacitor to last almost 17 times as long as it would otherwise without the benzil. It is believed that if a capacitor has a good life when subjected to direct current, it should have a similarly long life under alternating current conditions.

The beneficial effect of the addition of benzil to chlorinated diphenyl dielectric where copper foils form the electrodes with an impressed voltage of 860 volts per mil alternating current is given in the following table.

*Table II*

| Benzil Concentration | Avg. Capacitor Life, days, at 85° C. |
|---|---|
| Per cent | |
| 0 | 6.3 |
| 0.5 | 35 |

A capacitor with copper foil in contact with a chlorinated dielectric has a much poorer life as compared with a similar capacitor with aluminum foil. Therefore the improvement in life shown in Table II is highly desirable.

By combining a chlorinated diphenyl containing 50% to 60% chlorine dielectric fluid with nitrobenzil having a nitro group attached to each phenyl radical, in a capacitor employing a paper separator and aluminum foils at a temperature of 100° C. with 1,000 volts per mil direct current, the following results were obtained:

*Table III*

| Nitrobenzil Concentration, Per cent by weight | Average Capacitor Life in Days at 100° C. |
|---|---|
| 0 | 1.5 |
| 0.5 | 10.7 |

These results are more striking than secured

Nitrobenzil may be prepared with a total of from 1 to 4 nitro groups in the ortho and para positions. Good results have been obtained where each phenyl radical has one nitro group.

The diaryl diketones may be combined with halogenated dielectric fluids, such for example as those composed of mixtures of chlorinated diphenyl, particularly 50 to 60% chlorinated diphenyl, containing substantial amounts of aliphatic substituted chlorinated aryl compounds, such, for example, as ethyltetrachlorobenzene and ethylpentachlorobenzene. Aromatic compounds containing both fluorine and chlorine present in the same molecule or mixtures of chlorinated and fluorinated compounds may be employed. Chlorinated benzene and aliphatic derivatives thereof, diphenyl, diphenyl oxides, diphenyl with aliphatic and aryl groups attached thereto and numerous other organic compounds may be treated with the diaryl diketones. The diaryl diketones will stabilize the halogenated compounds against undue decomposition when alternating current or direct current stresses or both are applied thereto.

While the dielectric liquids composed of halogenated organic compounds combined with diaryl diketones give outstanding results in capacitors, they may be employed in numerous other forms of electrical apparatus. Figs. 2 to 4 of the drawing show diaryl diketone containing dielectrics in several types of apparatus. Referring to Fig. 2 of the drawing, the transformer 10 comprising the casing 12 and a hermetically sealed cover 14 fitted thereto carries electrical coils and core 16 immersed in the dielectric liquid 18. The dielectric liquid 18 may be advantageously prepared from a known incombustible halogenated organic compound stabilized with a quantity of diaryl diketone.

The capacitor 22 illustrated in Fig. 3 of the drawing comprises the casing 24 having the hermetically fitting cover 26 applied thereto. The metallic electrodes 28 composed of a sheet metal such for example as aluminum or copper foil are separated from one another by a plurality of layers of paper or other suitable insulating solid material 30. The dielectric liquid 32 in which the electrodes 28 and insulation 30 are immersed is composed of a halogenated compound such, for example, as chlorinated diphenyl combined with a suitable amount of a diaryl diketone, such, for instance, as benzil or nitrobenzil.

In some cases, the compositions of this invention may be applied to cable insulation. Referring to Fig. 4 of the drawing, there is illustrated the cable 36 comprising a conductor 38 about which there is applied a wrapping of paper, polyethylene, asbestos, or other insulation impregnated with a halogenated dielectric liquid containing a proportion of diaryl diketone. The sheath 42 of lead or other suitable metal provides for the maintenance of a proper hermetic condition for the impregnated insulation 40.

In all the examples, the apparatus will be found to function with greater freedom from deterioration of the halogenated dielectric liquids when a minor proportion of the liquid is composed of a diaryl diketone.

The diaryl diketones may be added to the halogenated dielectric liquid and the composition purified by clay treatment, or it may be added to a purified halogenated dielectric liquid by a simple stirring operation and the composition thus prepared in either manner may be introjected to a suitable vacuum treatment to remove air and moisture and the dielectric liquid composition introduced into the evacuated receptacle. In other cases, a supply of benzil or nitrobenzil or the like may be introduced into the electrical apparatus and when the dielectric liquid is introduced into the container the diaryl diketone will dissolve. The procedure employed will depend upon the requirements. Where apparatus has been previously installed with a supply of untreated halogenated dielectric liquid, a suitable amount of diaryl diketone may be introduced by pouring into the dielectric liquid where it will rapidly dissolve and will be rapidly distributed throughout the body of the liquid.

Since certain changes in carrying out the invention may be made without departing from the scope thereof, it is intended that all matter contained in the above description shall be interpreted as illustrative and not in a limiting sense.

We claim as our invention:

1. An electrical apparatus comprising, in combination, an electrical conductor composed of a metal selected from the class consisting of aluminum and copper and a dielectric liquid applied to the conductor, the dielectric liquid comprising a major proportion of a halogenated aromatic compound and from 0.01% to 5% by weight of a relatively non-ionizing diaryl diketone.

2. An electrical apparatus comprising, in combination, an electrical conductor composed of a metal selected from the class consisting of aluminum and copper and a dielectric liquid applied to the conductor, the dielectric liquid comprising a major proportion of a halogenated aromatic compound and from 0.01% to 5% by weight of benzil.

3. An electrical apparatus comprising, in combination, an electrical conductor composed of a metal selected from the class consisting of aluminum and copper and a dielectric liquid applied to the conductor, the dielectric liquid comprising a major proportion of a halogenated aromatic hydrocarbon and from 0.01% to 5% by weight of a nitrobenzil.

4. An electrical capacitor comprising, in combination, a pair of electrodes composed of a metal selected from the class consisting of aluminum and copper and a dielectric between the electrodes comprising a major proportion of a liquid halogenated aromatic compound and from 0.01% to 5% by weight of a relatively non-ionizing diaryl diketone.

5. An electrical capacitor comprising, in combination, a pair of electrodes composed of a metal selected from the class consisting of aluminum and copper and a dielectric between the electrodes comprising a major proportion of a liquid halogenated aromatic compound and from 0.01% to 5% by weight of benzil.

6. An electrical capacitor comprising, in combination, a pair of electrodes composed of a metal selected from the class consisting of aluminum and copper and a dielectric between the electrodes comprising a major proportion of a liquid halogenated aromatic hydrocarbon and from 0.01% to 5% by weight of nitrobenzil.

7. A dielectric composition composed of a liquid halogenated aromatic compound and from 0.01% to 5% by weight of a non-ionizing diaryl diketone.

8. A dielectric composition composed of a liquid halogenated aromatic compound and from 0.01% to 5% by weight of a benzil.

9. A dielectric composition composed of a liquid halogenated aromatic compound and from 0.01% to 5% by weight of nitrobenzil.

10. A dielectric composition composed of liquid chlorinated aromatics with a major proportion of chlorinated diphenyl and from 0.01% to 5% by weight of a non-ionizing diaryl diketone.

11. A dielectric composition composed of liquid chlorinated aromatics with a major proportion of chlorinated diphenyl and from 0.01% to 5% by weight of benzil.

12. A dielectric composition composed of liquid chlorinated aromatics with a major proportion of chlorinated diphenyl and from 0.01% to 5% by weight of nitrobenzil.

LEO J. BERBERICH.
RAYMOND FRIEDMAN.

REFERENCES CITED

The following references are of record in the file of this patent:

UNITED STATES PATENTS

| Number | Name | Date |
| --- | --- | --- |
| 2,008,680 | Carlisle | July 23, 1935 |
| 2,033,542 | Ralston | Mar. 10, 1936 |
| 2,039,837 | Ralston | May 5, 1936 |
| 2,077,429 | McMahon | Apr. 20, 1937 |
| 2,169,872 | Clark | Aug. 15, 1939 |
| 2,391,685 | Egerton | Dec. 25, 1945 |
| 2,391,688 | McLean | Dec. 25, 1945 |
| 2,391,689 | Egerton | Dec. 25, 1945 |
| 2,403,205 | Baer | July 2, 1946 |

FOREIGN PATENTS

| Number | Country | Date |
| --- | --- | --- |
| 493,961 | Great Britain | Oct. 18, 1938 |

OTHER REFERENCES

Page 91 of the book entitled "Dielectric Constant and Molecular Structure by Smyth. (Monograph series No. 55) 1931.

"Inhibiting Agents in the Oxidation of Unsaturated Organic Compound," Smith et al. Industrial and Engineering Chemistry, pages 691–693, July 1926.